(12) United States Patent
Budhai et al.

(10) Patent No.: US 10,747,653 B2
(45) Date of Patent: Aug. 18, 2020

(54) SOFTWARE TESTING SYSTEMS AND METHODS

(71) Applicant: SAP SE, Walldorf (DE)

(72) Inventors: Rooicann Budhai, Richmond (CA); Pritesh Tailor, Surrey (CA); Aidan Chan-Henry, Burnaby (CA); Ming Li, Vancouver (CA)

(73) Assignee: SAP SE, Walldorf (DE)

( * ) Notice: Subject to any disclaimer, the term of this patent is extended or adjusted under 35 U.S.C. 154(b) by 53 days.

(21) Appl. No.: 15/851,044

(22) Filed: Dec. 21, 2017

(65) Prior Publication Data

US 2019/0196946 A1 Jun. 27, 2019

(51) Int. Cl.
*G06F 11/36* (2006.01)
*G06F 11/30* (2006.01)
*G06F 8/70* (2018.01)
*G06F 8/71* (2018.01)

(52) U.S. Cl.
CPC ............ *G06F 11/3688* (2013.01); *G06F 8/70* (2013.01); *G06F 8/71* (2013.01); *G06F 11/302* (2013.01); *G06F 11/3692* (2013.01)

(58) Field of Classification Search
CPC ......... G06F 11/36–3696; G06F 11/3668–3692
See application file for complete search history.

(56) References Cited

U.S. PATENT DOCUMENTS

| | | | | |
|---|---|---|---|---|
| 9,032,259 B1* | 5/2015 | Hood | ................ | G06F 11/3692 714/57 |
| 2003/0121025 A1* | 6/2003 | Farchi | ................ | G06F 11/3676 717/124 |
| 2005/0257086 A1 | 11/2005 | Triou, Jr. et al. | | |
| 2007/0074149 A1* | 3/2007 | Ognev | ................ | G06F 11/366 717/101 |
| 2007/0168734 A1* | 7/2007 | Vasile | ................ | G06F 11/3672 714/33 |
| 2014/0096113 A1* | 4/2014 | Kuehlmann | ........ | G06F 11/3672 717/126 |

(Continued)

OTHER PUBLICATIONS

Palomba, Fabio, and Andy Zaidman. "Does refactoring of test smells induce fixing flaky tests?." 2017 IEEE international conference on software maintenance and evolution (ICSME). IEEE, 2017. (Year: 2017).*

(Continued)

*Primary Examiner* — Doon Y Chow
*Assistant Examiner* — Joanne G Macasiano
(74) *Attorney, Agent, or Firm* — Fountainhead Law Group P.C.

(57) ABSTRACT

In one embodiment, the present disclosure pertains to software testing. In one embodiment, a plurality of builds are generated from a plurality of branches of software code, where the plurality of builds are executable versions of the plurality of branches. Software tests are applied to the plurality of builds based on associated test filters to produce test results. Different builds may have different associated test filters to control which of the plurality of software tests are applied to an associated build. In one embodiment, software tests that did not pass for a particular build are recorded in the associated test filter for the particular build based on an association between the software test that did not pass and a particular runtime feature under test.

18 Claims, 5 Drawing Sheets

(56) References Cited

U.S. PATENT DOCUMENTS

| | | | | |
|---|---|---|---|---|
| 2015/0033212 | A1* | 1/2015 | Mizobuchi | G06F 11/3688 717/131 |
| 2015/0286558 | A1* | 10/2015 | Bartlow | G06F 8/71 717/131 |
| 2016/0328315 | A1* | 11/2016 | Rajamanickam | G06F 11/3676 |
| 2019/0087315 | A1 | 3/2019 | Tailor et al. | |

OTHER PUBLICATIONS

Merron, Atif M., and Myra B. Cohen. "Automated testing of GUI applications: models, tools, and controlling flakiness." 2013 35th International Conference on Software Engineering (ICSE). IEEE, 2013. (Year: 2013).*

Luo, Qingzhou, et al. "Can We Trust Test Outcomes?." Network 5 (2014): 1. (Year: 2014).*

Luo et al. "An Empirical Analysis of Flaky Tests" in Proceedings of the 22nd ACMSIGSOFT International Symposium on Foundations of Software Engineering, Hong Kong, China, Association for Computing machinery, Nov. 16-21, 2014, pp. 643-653.

Luo et al. "Flaky Test Handler Plugin" in Jenkins Wiki, downloaded from //wiki.jenkins-ci.org/display/JENKINS/Flaky + Test+Hanler+ Plugin, Nov. 15, 2014, 5 pages.

Rich Trott, "Flaky Test", downloaded from //github.com/nodejs/ node/wiki/Flaky-tests, Jan. 26, 2016, 1 page.

Martin Poschenrieder, "How to Address Flaky Tests", downloaded from //blog.testmunk.com/how-to-address-flaky-tests/, Mar. 29, 2016, 5 pages.

Nebojsa Stricevic, "How to Deal With and Eliminate Flaky Tests", downloaded from //semaphoreci.com/community/tutorials/how-to-deal-with-and-eliminate-flaky-tests, May 27, 2015, 7 pages.

* cited by examiner

SOFTWARE TESTING SYSTEMS AND METHODS

BACKGROUND

The present disclosure relates to computing and data processing, and in particular, to software test systems and methods.

Computer software programs are typically written in code defined by one of a wide variety of computer software languages. Example languages include C++, Java, Javascript, C #, and the like. A developer typically writes code that often performs many functions, and then the code may be tested and deployed. One issue that arises in a test context pertains to repeatability of each test. Ideally, if the code is functioning properly, a test of the code should pass every time the test is performed, and, if the code is not functioning properly, a test of the code should yield failures every time. More specifically, for a test that includes multiple test routines to check the performance of various sub-functions of the code, each of the test routines should either pass or fail, but not both, every time a test program is executed against the code.

However, in some cases a test may fail on some occasions and pass on others with the same configuration of the code under test. Such tests could be harmful for developers because their failures do not always indicate bugs in the code.

Another issue with software testing pertains to determining which tests, from a batch of tests, may need to be applied.

The present disclosure provides techniques for improving software testing.

SUMMARY

In one embodiment, the present disclosure pertains to software testing. In one embodiment, a plurality of builds are generated from a plurality of branches of software code, where the plurality of builds are executable versions of the plurality of branches. Software tests are applied to the plurality of builds based on associated test filters to produce test results. Different builds may have different associated test filters to control which of the plurality of software tests are applied to an associated build. In one embodiment, software tests that did not pass for a particular build are recorded in the associated test filter for the particular build based on an association between the software test that did not pass and a particular runtime feature under test. For example, if tests both pass and fail (aka flaky tests), then such tests may be automatically recorded in the test filter for the build, for example.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
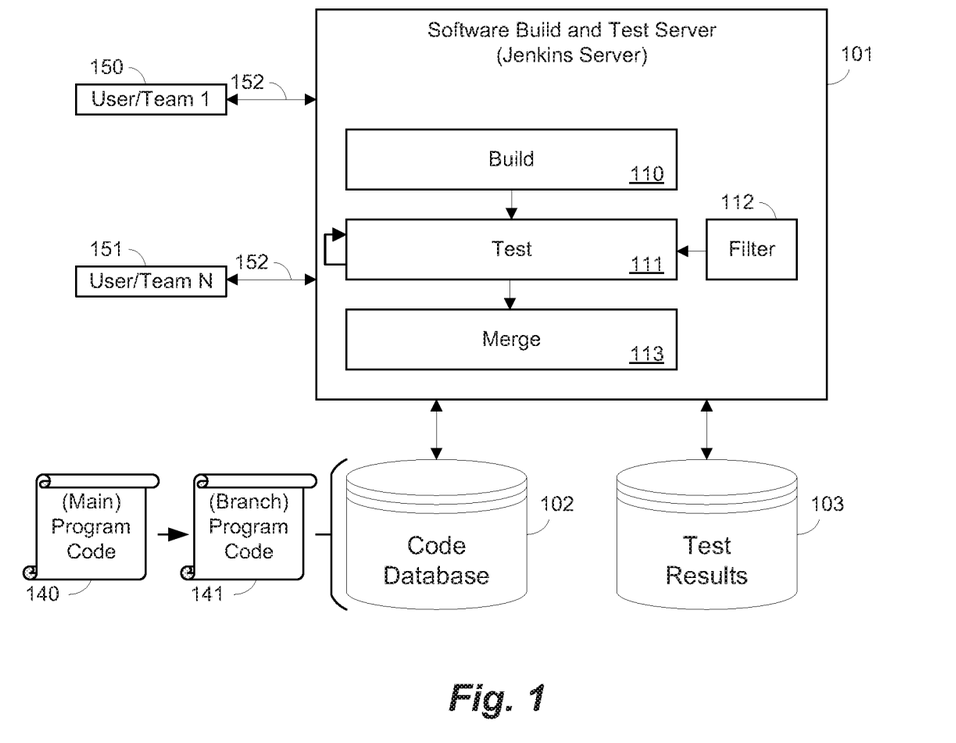
FIG. 1 illustrates a software test system according to one embodiment.

FIG. 1 illustrates an architecture for software testing according to one embodiment. Features and advantages of the present disclosure include techniques for efficiently filtering software tests out of a build flow when particular software tests do not pass or are flaky. As described herein, the system may track software tests for different features and the users/teams responsible for programming particular features so development teams can more efficiently develop, build, test, and release code changes. For example, different software developers (aka "programmers," "users," or "teams") may copy a main program code 140 and make changes to the main code. The changed code is known as a code "branch" 141. Different users may be responsible for implementing or improving particular features of the main program, for example. Thus, one branch may include changes associated with one feature, and another branch may include changes associated with another feature.

Figure 2:
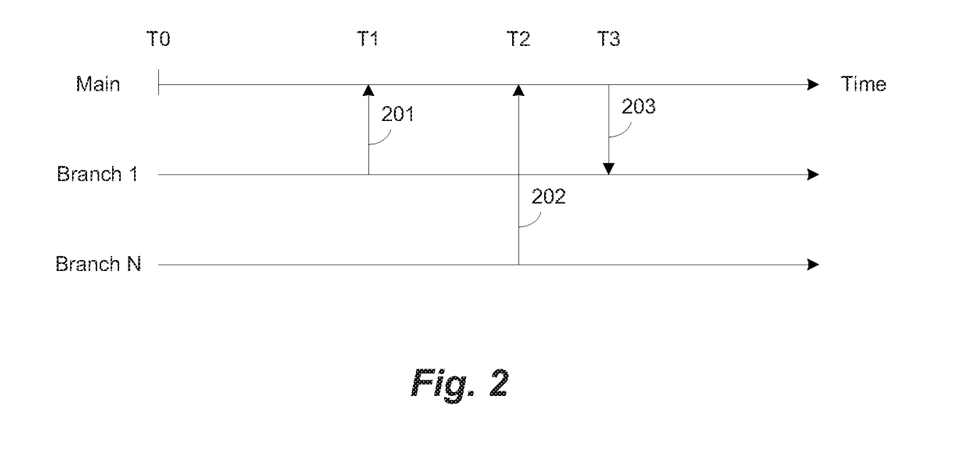
FIG. 2 illustrates copying main software code and merging branches according to one embodiment.

As illustrated in FIG. 1, different users/teams 150-151 may access, change, build, and test code, for example, using a software build and test server 101 coupled to a code database 102. Server 101 may be a Jenkins server accessed by users 150-151 over a network 152, for example. Accordingly, server 101 may receive multiple branches of software code from a plurality of users 150-151, where the branches of software code correspond to copies of a main version of software code 140 modified by users 150-151. As mentioned above, the different users may modify different portions of the software code corresponding to different runtime features to produce different branches 141 of software code, for example. This is illustrated in FIG. 2, which shows a main version of source code, Main, and two branches of source code, Branch 1 and Branch 2. In this example, Branch 1 may be a complete copy of the main version, but with modifications or enhancements added, for example, directed toward particular features. Branch 2 may also be a complete copy of the main version, but with modifications or enhancements added, for example, directed toward different features. At time T1, Branch 1 may be merged, at 201, back into the main code. Similarly, at time T2, Branch 2 may be merged, at 202, back into the main code. A prerequisite for merging code branches back into the main code may be that the branches have been successfully built and tested (e.g., pass a full range of software tests over many test cycles). Time T3 illustrates additional changes to Branch 1 that may be required after the changes to Branch 2 have been merged into the main version at T2. Branch 1 is thus synchronized to the latest version of the main code at 203. Many additional branches may be copied from the main code, modified, merged, and/or synchronized as described herein. One challenge pertaining to this process is when software tests fail, such failure may impact different builds in different ways.

Server 101 may include a build component 110 to convert source code branches 141 to executable code, for example. Accordingly, server 101 may generate builds from the plurality of branches of software code. The builds are each executable versions of the branches having different user modified runtime features, for example. Once a code branch is built, software tests may be applied to the builds to test the executable code. For example, server 101 may include a test component 111 to test the various builds and produce test results, which may be stored in a test result repository 103, such as a database, for example. In particular embodiments, each software test applied by test component 111 may be associated with at least one of the runtime features. For example, a particular feature may be tested using one or multiple tests. Such tests may also be associated with users/teams responsible for making the code changes for the particular features, for example. For instance, a user working on feature A may also develop test A to test some or all of feature A.

In one embodiment, the software tests are applied to builds based on associated test filters 112, where different builds have different associated test filters, for example. The test filters may comprise a test filter data structure to control, at least in part, which of the software tests are applied to an associated build, for example.

Features and advantages of the present disclosure further include determining whether each software test has failed or both passed and failed. Embodiments may record failed tests in the test filter associated with the build. For example, when a test both passes (one or more times) and then fails (or fails and then passes), such a test is referred to as a "flaky" test. In one example implementation, a flaky test may be a test that fails multiple times and then passes at least once. In some cases, a software test that is associated with a particular feature in a particular build for which the user or team is responsible may fail or be flaky (e.g., the flaky test impacts their feature and their code changes). In other cases, a software test that is associated with a particular feature in the particular build for which the user or team is not responsible may fail or be flaky (e.g., the flaky test impacts another user's feature and code changes). Embodiments of the disclosure may distinguish between these two situations. For example, holding up a release due to a flaky test of a user's own build can slow down development timelines and cause delays. Features and advantages of the present disclosure may record failed or flaky software tests a test filter when the test pertains to a feature the user/team is responsible for and may have modified in the code branch (e.g., user modified runtime features). The resulting test filter is then associated with the particular build generated from the code branch modified by the particular user/team, for example. Accordingly, when a software test associated with a user modified runtime feature of a particular build both passes and fails, for example, then the software test is recorded in the test filter data structure for the particular build. Advantageously, some embodiments may remove the software tests recorded in the test filter data structure from being applied during testing, so flaky tests do not slow down the development process, for example.

Figure 3:
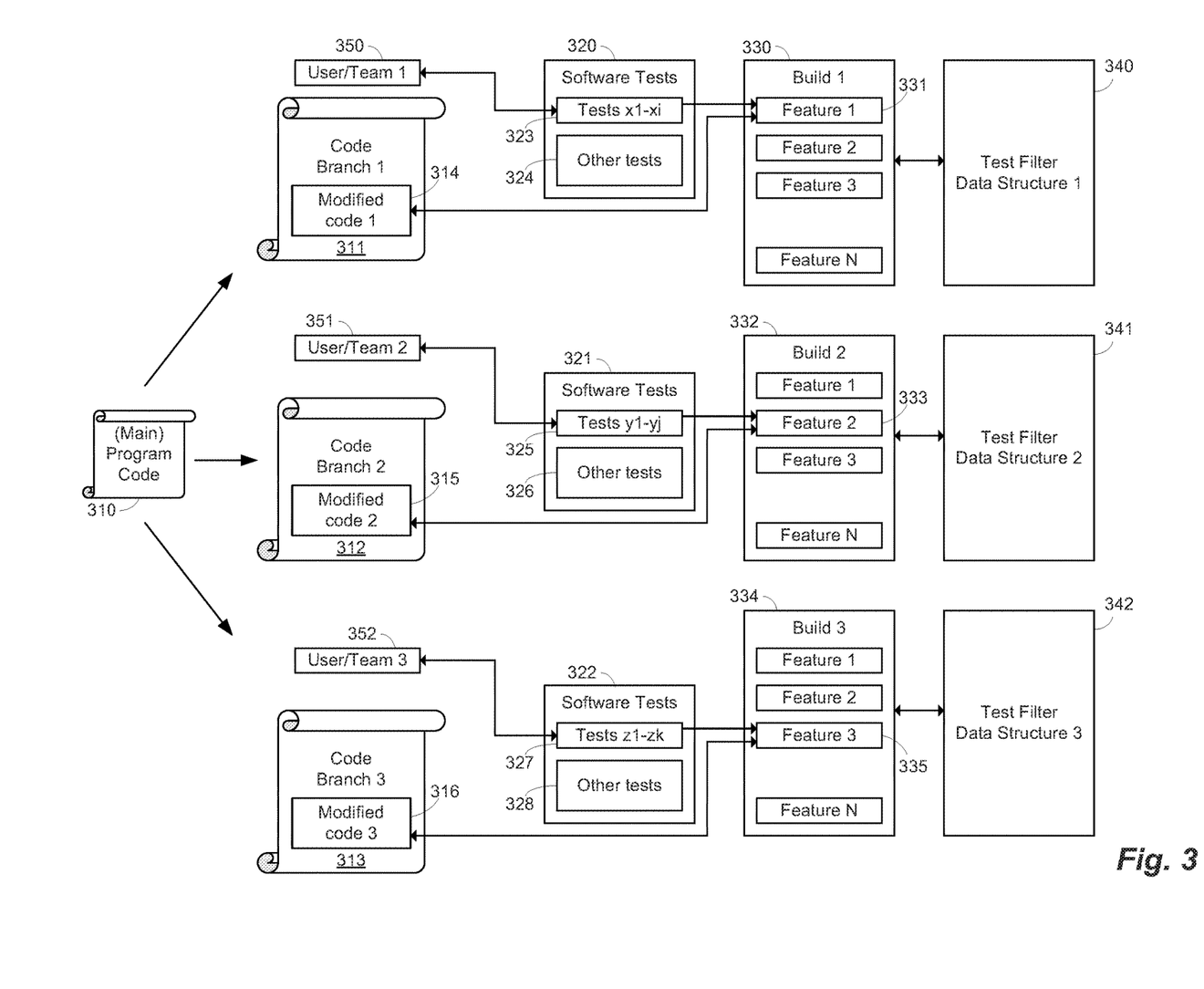
FIG. 3 illustrates an example architecture for software testing according to another embodiment.

FIG. 3 illustrates an example architecture for software testing according to another embodiment. In this example, three users and/or teams 350-352 are tasked with modifying particular features of a software program. Accordingly, each user/team may check out a copy of the main program code 310 and modify different sections of the code for which they are responsible. For example, user 350 may modify code 1 to produce code branch 1 311, user 351 may modify code 2 to produce code branch 2 312, user 352 may modify code 3 to produce code branch 3 313. Because different users/teams are responsible for different features, modified code 1 may be associated with feature 1 331 in a resulting build 1 330, modified code 2 may be associated with feature 2 333 in a resulting build 1 332, and modified code 3 may be associated with feature 3 335 in a resulting build 3 334, for example. Similarly, different software features may have different associated software tests. For example, software tests 320 may include tests for testing the full suite of features (e.g., feature 1-N), where certain tests x1-xi 323, which are associated with user 350, are specifically for testing that user's modified feature 1 331. Other tests 324 may test the remaining features build 1, for example. Similarly, software tests 321 may include tests for testing the full suite of features (e.g., feature 1-N), where certain tests y1-yj 325, which are associated with user 351, are specifically for testing that user's modified feature 2 333, for example. Other tests 326 may test the remaining features in build 2, for example. Likewise, software tests 322 may include tests for testing the full suite of features (e.g., feature 1-N), where certain tests z1-zk 327, which are associated with user 352, are specifically for testing that user's modified feature 3 335, for example. Other tests 328 may test the remaining features in build 3, for example.

As illustrated in FIG. 3, each build may be based on code changes to particular features associated with particular users or teams. Accordingly, each of the user modified features has associated software tests to test those features. Advantageously, embodiments of the present disclosure may associate different test filters with different builds so that failed or flaky tests for a particular build may be recorded and filtered out on subsequent test runs if those tests are associated with one of the features modified by the user/team responsible for the build and code branch. Accordingly, flaky tests, for example, may be automatically removed from the test list (as unreliable) to streamline the development and release process, for example. Additionally, in some embodiments, records may be automatically generated in a bug tracking database upon and recording of a flaky test for a user modified runtime feature. In this example, user 350 modifies code 314 in branch 311, which results in user modified runtime feature 331 in build 330. Build 330, in turn, has an associated test filter data structure 340. Test filter data structure 340 controls which of the plurality of software tests 320 are applied to associated build 330. For example, if software test x1 is determined to be flaky, then test x1 may automatically be recorded in test filter data structure 340 because test x1 is associated with a user modified runtime feature 331. Accordingly, on subsequent applications of software tests 320, test x1 is not applied against build 330, for example. Similarly, user 351 modifies code 315 to produce branch 312, which results in user modified runtime feature 333 in build 332. Build 332, in turn, has an associated test filter data structure 341. Test filter data structure 341 controls which of the plurality of software tests 321 are applied to associated build 332. For example, if software test y1 is determined to be flaky, then test y1 may automatically be recorded in test filter data structure 341 because test y1 is associated with a user modified runtime feature 333. Accordingly, on subsequent applications of software tests 321, test y1 is not applied against build 332, for example. Additionally, test y1 may be added to a bug database or management system automatically for a user to fix, for example. Build 334 may have a similar customized test filter data structure 342, which may be modified automatically in the same was as data structures 340 and 341.

In some embodiments, the test filter data structures may comprise a record of all core software tests associated with the user modified runtime feature (e.g., tests x1-xi 323 associated with feature 1 331) and a record of software tests that both passed and failed (i.e., flaky tests) that are also core software tests. For example, if x1 is flaky and is also a core test to feature 1 331, then it is automatically recorded in data structure 340 as described above. Once a flaky test is recorded in the test filter data structure, the flaky test is no longer applied to the build on subsequent test runs. Advantageously, flaky tests for features within a user/team's scope of work may be automatically removed from the test flow to streamline the development process. In one embodiment, the test filter data structure 340 further comprises one or more software tests associated with non-user modified runtime features. For example, test filter data structure 340 may record additional tests that are not core tests (e.g., tests on runtime features that are outside the user/team's scope of work). Accordingly, some embodiments may allow different builds to be associated with different test filters that selectively remove both core tests and tests that are not core tests, but may be core tests for another user/team's build, for example.

Figure 4:
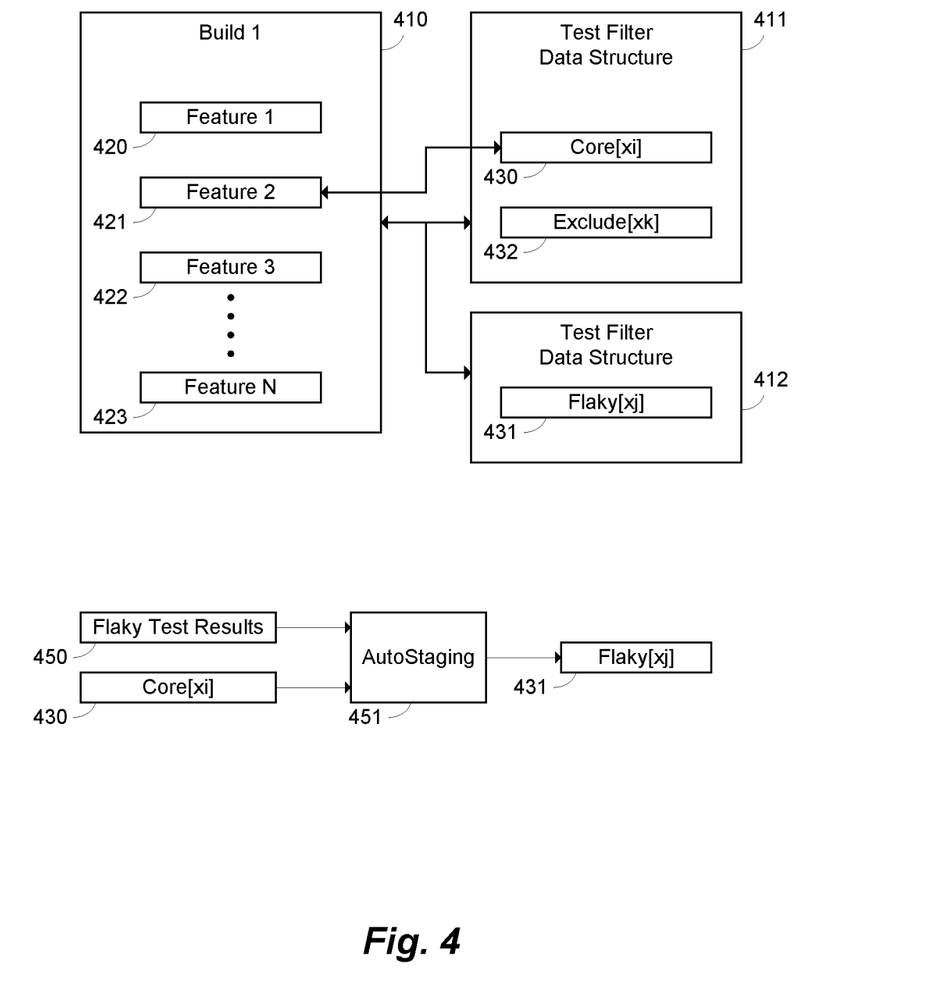
FIG. 4 illustrates a build and associated filter data structure according to another embodiment.

FIG. 4 illustrates a build and associated filter data structure according to another embodiment. Build 410 may comprise executable software comprising many features 420-423. In some example implementations, it may be advantageous to use two separate files for the test filter. In this example, two test filter data structures 411 and 412 are associated with build 410. Test filter data structures 411-412 may comprise a plurality of data sets for recording tests. For example, test filter data structure 411 includes a core test set 430 ("Core[xi]") and an exclude data set 432 ("Exclude[xk]"). Test filter data structure 412 includes flaky test set 431 ("Flaky[xj]"). As mentioned above, the core set is a record of all core software tests associated with the user modified runtime features, the flaky set is a record of software tests that both passed and failed that are also core software tests, and the exclude set is one or more software tests associated with non-user modified runtime features that are to be excluded from testing (e.g., as determined by a user). Excluded tests may include core tests that are known to have issue and currently being fixed, for example. In this example, manually entered tests to be filtered are stored in a first data structure file 411, and automatically entered flaky tests to be filtered are stored in a second data structure file 412. Here, the users/team responsible for the code branch leading to build 410 were responsible for feature 421, and may have made modifications or enhancements to feature 421. Accordingly, the test filter data structure 411 core set 430 records software tests for testing aspects of feature 421. In this example, as software tests are applied to build 410, software tests that produce flaky results at 450 (e.g., fail and pass) are compared to core tests 430. If the software test that produces a flaky result (a flaky test) is one of the core tests for the particular build, as determined by autostaging component 451 using the information in test filter data structure 411, for example, then the flaky test is recorded in the flaky test set 431. However, when a software test associated with a non-user modified runtime feature (e.g., feature 420) of build 411 both fails and passes, then the software test may not be recorded in the test filter data structure 411 for build 410, for example. As mentioned above, tests recorded in Flaky[xj] may be automatically recorded in a bug management database, for example.

As mentioned above, it may be advantageous to use two separate files for the test filter, where manually entered tests to be filtered are stored in a first file, and automatically entered flaky tests to be filtered are stored in a second file. Such an approach may to avoid edit conflicts between users editing the test filter and a computer program automatically editing the test filter. During execution, the first file of manually entered tests to be filtered (e.g., file "testFilter_Branch_A.properties" below) may be read into memory, and then the second file of automatically entered flaky tests to be filtered (e.g., file "testFilter_Branch_A.flaky.properties" below) may be read into memory and appended to filtered tests from the first file to form a complete list of filtered tests, for example. As illustrated below, structures 411 and 412 may be stored in different formats, and structure 412 may be converted to the format of structure 411 as part of the test filter merging process. The following illustrates an example implementation:

1. Automatically generated flaky test filter file: testFilter_Branch_A.flaky.properties
==content of testFilter_Branch_A.flaky.properties==
test.fpa.ui.chartbuilder.FeedPanelSpec=\ TEST SPEC NAME—test file with multiple test cases.
Example test case: ProfitAndLoss with Income Statement and Currency selected.member and range search result items available for date time dimension \ name of test case that was flaky and added to final The above illustrates the format of "testFilter_Branch_A.flaky.properties." The format is as follows:
abcSpec=\ Test Spec Name
    test case 1 of abcSpec, \ Test cases for abcSpec
    test case 2 of abcSpec
defSpec=\
    test case 1 from defSpec, \
    test case 2 from defSpec, \

2. Manually created test filter file: testFilter_Branch_A.properties
==content of testFilter_Branch_A.properties==
Determines the owned, or core, test specs to be executed; NONE for no tests; list packages with same format as xs.packages
jasmine.specs.core=\
    test.fpa.ui.bi.com.sap.epm.story.settings,\
    test.fpa.ui.bundles.helpers,\
    test.fpa.ui.chartbuilder,\
    test.fpa.ui.bundles.sap.bi.va.cvomdataadapter
Determines the unowned additional test specs; NONE for no tests
jasmine.specs.extra=\
    test.fpa.ui.control.cellchartbuilder,\
    test.fpa.ui.dashboard
Define specs to be excluded—Excluded tests
jasmine.exclude.specs.fpa=\
    test.fpa.uipa.reportEngine.integration. integration14.LocalDimensionSupportSpec,\
    test.fpa.ui.pa.reportEngine.integration. integration11.TableComplexFilterBasicSpec
Manual Staging List:
The packages or specs listed should be a subset of core tests
These staged tests will not run
jasmine.specs.staging=\
    test.fpa.ui.chartbuilder.TableComplexFilterAdvanceSpec,\
    test.fpa.ui.chartbuilder.OtherSpec
    illustrates the format of "testFilter_Branch_A.properties." The format is as follows:

[Category]=[TEST SPEC NAME]

Figure 5:
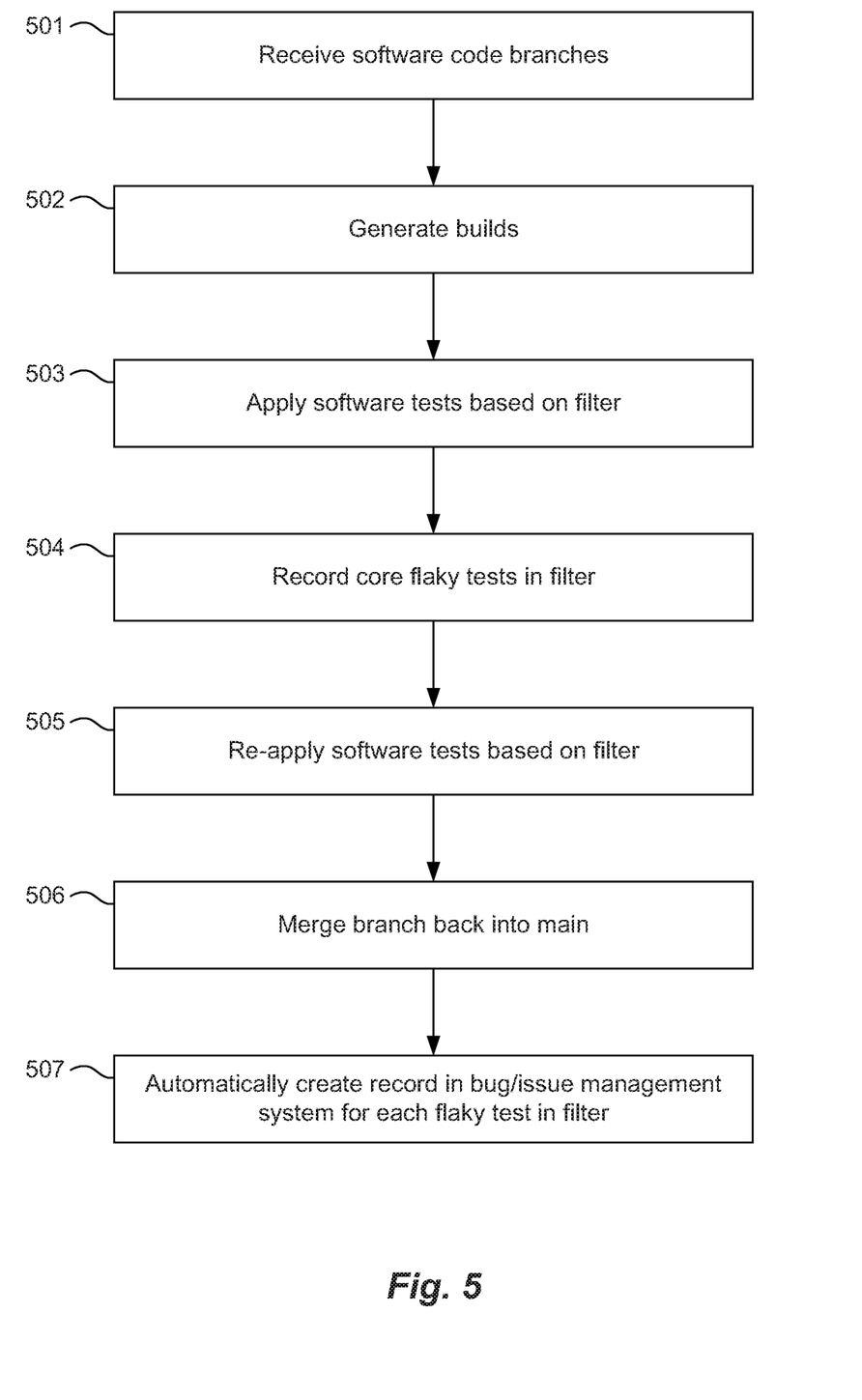
FIG. 5 illustrates a method according to another embodiment.

As mentioned above, when the information from the two data structures is read into memory, the formats may be translated. In one example embodiment, the format of "testFilter_Branch_A.flaky.properties" is translated into a [Category]=[Test Spec Name] as follows:

jasmine.exclude.auto_staging.specs.fpa=\
   abcSpec,\
   defdefSpec,\
   ghiSpec FIG. 5 illustrates an example method according to another embodiment. At 501, a plurality of branches of software code from a plurality of users is received in a software test server, such as a Jenkins server, for example. The branches of software code may correspond to copies of a main version of software code modified by the plurality of users. Different users may modify different portions of the software code corresponding to different runtime features to produce different branches of software code, for example. At 502, a plurality of builds are generated from the plurality of branches of software code. As mentioned above, the plurality of builds are executable versions of the plurality of branches having different user modified runtime features, for example. At 503, a plurality of software tests are applied to the plurality of builds based on an associated test filter to produce test results. In one embodiment, each software test is associated with at least one of the runtime features, and different builds have different associated test filters. In one example implementation, the test filters comprise a test filter data structure to control, at least in part, which of the plurality of software tests are applied to an associated build. At 504, the server determines whether each software test was both passed and failed, and when a software test associated with a user modified runtime feature of a particular build both passes and fails (a flaky test), then the software test is recorded in the test filter data structure for the particular build. At 505, the plurality of software tests are re-applied to the plurality of builds based on the associated test filter to produce test results. When all of the plurality of software tests pass a predetermined number of times (e.g., 4 times with no failed tests) for a particular build, then the branch used to generate the build is merged into the main version of software code at 506. At 507, the system may automatically create a record in a bug/issue management system (e.g., a debugging database) for each flaky test added to the filter, for example.

Hardware

Figure 6:
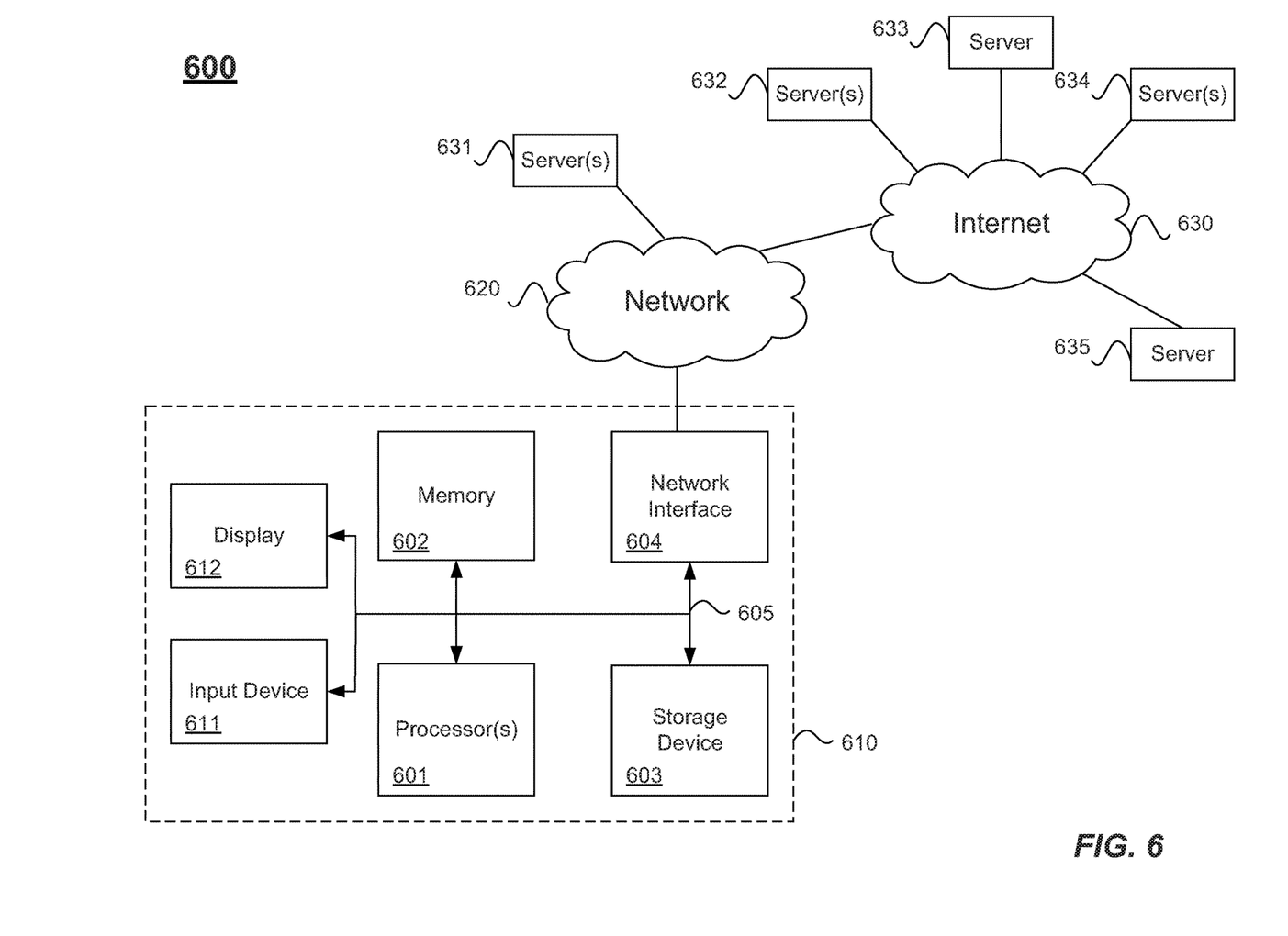
FIG. 6 illustrates hardware of a special purpose computing machine configured according to the above disclosure.

FIG. 6 illustrates hardware of a special purpose computing machine configured according to the above disclosure. The following hardware description is merely one example. It is to be understood that a variety of computers topologies may be used to implement the above described techniques. An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. Memory 602 may also be used for storing programs executed by processor(s) 601. Possible implementations of memory 602 may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device 603 and memory 602 are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses for coupling various components of the computer together, for example.

Computer system 610 also includes a network interface 604 coupled with bus 605. Network interface 604 may provide two-way data communication between computer system 610 and a local network 620. Network 620 may represent one or multiple networking technologies, such as Ethernet, local wireless networks (e.g., WiFi), or cellular networks, for example. The network interface 604 may be a wireless or wired connection, for example. Computer system 610 can send and receive information through the network interface 604 across a wired or wireless local area network, an Intranet, or a cellular network to the Internet 630, for example. In some embodiments, a browser, for example, may access data and features on backend software systems that may reside on multiple different hardware servers on-prem 631 or across the Internet 630 on servers 632-635. One or more of servers 632-635 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
generating a plurality of builds from a plurality of branches of software code, wherein the plurality of builds are executable versions of the plurality of branches;
applying a plurality of software tests to the plurality of builds based on associated test filters to produce test results, wherein different builds have different associated test filters to control which of the plurality of software tests are applied to an associated build, wherein the associated test filters each comprise a test filter data structure to control, at least in part, which of the plurality of software tests are applied to an associated build; and
automatically recording software tests that did not pass for a particular build in an associated test filter for the particular build based on an association between a software test that did not pass and a particular runtime feature under test, wherein each of the test filter data structures comprises:
a record of all core software tests stored as a first file in a first format, the core software tests are associated with a user modified runtime feature; and
a record of software tests that both passed and failed that are also core software tests, stored as a second file in a second format different from the first format, wherein the software tests that both passed and failed and that are also core software tests are no longer applied to the particular build on subsequent test runs.

2. The method of claim 1 wherein the test filter data structure further comprises a record of one or more software tests associated with non-user modified runtime features.

3. The method of claim 1 wherein each software test is associated with the particular runtime feature.

4. The method of claim 1 further comprising receiving a plurality of branches of software code from a plurality of users, wherein the plurality of branches of software code correspond to copies of a main version of software code modified by the plurality of users, and wherein different users modify different portions of the software code corresponding to different runtime features to produce different branches of software code.

5. The method of claim 1 further comprising re-applying the plurality of software tests to the plurality of builds based on the associated test filters to produce new test results associated with re-applying the plurality of software tests, wherein when all of the plurality of software tests pass a predetermined number of times for the particular build, then the branch used to generate the particular build is merged into the main version of software code.

6. The method of claim 1 further comprising storing in a bug management database, a record of the software tests that both passed and failed.

7. A method comprising:
receiving a plurality of branches of software code from a plurality of users, wherein the branches of software code correspond to copies of a main version of software code modified by the plurality of users, and wherein different users modify different portions of the software code corresponding to different runtime features to produce different branches of software code;
generating a plurality of builds from the plurality of branches of software code, wherein the plurality of builds are executable versions of the plurality of branches having different user modified runtime features;
applying a plurality of software tests to the plurality of builds based on an associated test filter to produce test results, wherein each software test is associated with at least one of the different runtime features, and wherein different builds have different associated test filters, the associated test filter comprising a test filter data structure to control, at least in part, which of the plurality of software tests are applied to an associated build; and
determining whether each software test was both passed and failed, wherein when a software test associated with a user modified runtime feature of a particular build both passes and fails, then the software test is recorded in the test filter data structure for the particular build,
wherein the test filter data structure comprises:
a record of all core software tests stored as a first file in a first format, the core software tests are associated with a user modified runtime feature; and
a record of software tests that both passed and failed that are also core software tests, stored as a second file in a second format different from the first format, wherein the software tests that both passed and failed that are also core software tests are no longer applied to the particular build on subsequent test runs.

8. The method of claim 7 wherein when a software test associated with a non-user modified runtime feature of the particular build both passes and fails, then the software test associated with the non-user modified runtime feature is not recorded in the test filter data structure for the particular build.

9. The method of claim 7 wherein the test filter data structure further comprises a record of one or more software tests associated with non-user modified runtime features.

10. The method of claim 7 wherein software tests recorded in the test filter data structure are not applied to the plurality of builds.

11. The method of claim 7 further comprising re-applying the plurality of software tests to the plurality of builds based on the associated test filter to produce new test results, wherein when all of the plurality of software tests pass a predetermined number of times for the particular build, then the branch used to generate the particular build is merged into the main version of software code.

12. The method of claim 7 further comprising storing in a bug management database, a record of the software tests that both passed and failed.

13. A non-transitory machine-readable medium storing a program executable by at least one processing unit of a device, the program comprising sets of instructions for:
generating a plurality of builds from a plurality of branches of software code, wherein the plurality of builds are executable versions of the plurality of branches;
applying a plurality of software tests to the plurality of builds based on associated test filters to produce test results, wherein different builds have different associated test filters to control which of the plurality of software tests are applied to an associated build, wherein the associated test filters each comprise a test filter data structure to control, at least in part, which of the plurality of software tests are applied to an associated build; and
automatically recording software tests that did not pass for a particular build in an associated test filter for the particular build based on an association between a software test that did not pass and a particular runtime feature under test,
wherein the test filter data structure comprises:
a record of all core software tests stored as a first file in a first format, the core software tests are associated with a user modified runtime feature; and
a record of software tests that both passed and failed that are also core software tests, stored as a second file in a second format different from the first format, wherein the software tests that both passed and failed and that are also core software tests are no longer applied to the particular build on subsequent test runs.

14. The non-transitory machine-readable medium of claim 13 wherein the test filter data structure further comprises a record of one or more software tests associated with non-user modified runtime features.

15. The non-transitory machine-readable medium of claim 13 wherein each software test is associated with the particular runtime feature.

16. The non-transitory machine-readable medium of claim 13 further comprising receiving a plurality of branches of software code from a plurality of users, wherein the plurality of branches of software code correspond to copies of a main version of software code modified by the plurality of users, and wherein different users modify different portions of the software code corresponding to different runtime features to produce different branches of software code.

17. The non-transitory machine-readable medium of claim 13 further comprising re-applying the plurality of software tests to the plurality of builds based on the associated test filters to produce new test results, wherein when all of the plurality of software tests pass a predetermined number of times for the particular build, then the branch used to generate the particular build is merged into the main version of software code.

18. The non-transitory machine-readable medium of claim 13 wherein the program further comprises instructions for storing in a bug management database, a record of the software tests that both passed and failed.

\* \* \* \* \*